United States Patent [19]

Blight et al.

[11] Patent Number: 4,849,900
[45] Date of Patent: Jul. 18, 1989

[54] FLIGHT CONTROL SYSTEM AND METHOD

[75] Inventors: James D. Blight, Redmond; Dagfinn Gangsaas, Bellevue, both of Wash.

[73] Assignee: The Boeing Company, Seattle, Wash.

[21] Appl. No.: 860,944

[22] Filed: May 2, 1986

[51] Int. Cl.$^4$ ............................................. G06F 15/50
[52] U.S. Cl. ..................................... 364/434; 244/180
[58] Field of Search ............... 364/434, 435, 432, 424, 364/451, 428; 244/180–182, 178, 191; 318/583, 584

[56] References Cited

U.S. PATENT DOCUMENTS

| | | |
|---|---|---|
| 2,925,967 | 2/1960 | Jofeh . |
| 2,967,680 | 1/1961 | Meyers et al. . |
| 2,974,908 | 3/1961 | Platt . |
| 3,033,496 | 5/1962 | Brands . |
| 3,062,486 | 11/1962 | Shepherd . |
| 3,175,786 | 3/1965 | Frank et al. . |
| 3,345,018 | 10/1967 | Chanak et al. . |
| 3,476,335 | 11/1969 | Andeen et al. . |
| 3,493,826 | 2/1970 | Wandrey . |
| 3,510,090 | 5/1970 | Falkner et al. ...................... 244/180 |
| 3,520,499 | 7/1970 | Ask . |
| 3,521,838 | 7/1970 | Buffum et al. . |
| 3,584,814 | 6/1971 | Murphy . |
| 3,588,007 | 6/1971 | Naumann . |
| 3,658,280 | 4/1972 | McDonnell . |
| 3,733,039 | 5/1973 | O'Connor et al. . |
| 3,911,436 | 10/1975 | Schänzer et al. .................. 364/451 |
| 3,920,966 | 11/1975 | Kremeyer et al. .................. 364/424 |
| 3,945,593 | 3/1976 | Schänzer ............................. 364/435 |
| 3,984,071 | 10/1976 | Fleming ............................. 364/434 |
| 4,092,716 | 5/1978 | Berg et al. .......................... 364/434 |
| 4,109,886 | 8/1978 | Tribken et al. . |
| 4,198,017 | 4/1980 | Murray . |
| 4,236,685 | 12/1980 | Kissel . |
| 4,261,537 | 4/1981 | Tisdale, Sr. et al. ............... 244/181 |
| 4,373,184 | 2/1983 | Lambregts . |
| 4,413,320 | 11/1983 | Bradan et al. ...................... 364/428 |
| 4,527,242 | 7/1985 | McElreath et al. ................. 364/432 |
| 4,628,455 | 12/1986 | Skutecki ............................. 364/434 |

Primary Examiner—Thomas H. Tarcza
Assistant Examiner—Tod Swann
Attorney, Agent, or Firm—Finnegan, Henderson, Farabow, Garrett, & Dunner

[57] ABSTRACT

A flight control system combines airspeed with normal acceleration to produce a feedback signal and combines the feedback signal with a feedforward signal consisting of a pilot command signal to produce a differential acceleration signal which is used to control elevator control surface of an aircraft to provide enhanced pitch stability.

21 Claims, 2 Drawing Sheets

FLIGHT CONTROL SYSTEM AND METHOD

BACKGROUND OF THE INVENTION

1. Field of the Invention

The present invention relates to flight vehicle control systems and methods and, more particularly, to a flight vehicle control system and method for controlling flight vehicle performance in which pilot commands are combined with a selected set of sensor measurements to produce appropriate flight control responses.

2. Description of the Related Art

It is well known in the art that the performance of flight vehicles such as aircraft can be significantly improved where automatic control is used to translate pilot commands such as stick force or control column force into flight control actions, such as positioning of aerodynamic control surfaces.

Similarly, closed loop control systems and methods which use flight vehicle performance data (typically derived from sensors) to automatically adjust flight control parameters, such as in positioning of aerodynamic control surfaces, are also known to improve flight performance. These systems and methods, often referred to as automatic pilots, operate independently of pilot commands.

Attempts have been made in the past, with varying degrees of success, to devise control systems and methods which combine pilot commands with automatic closed loop control systems to produce an integrated response capable of controlling flight vehicle performance throughout the various phases of flight. However, these systems and methods have sometimes suffered from limited or poor response characteristics.

The state of the prior art in flight vehicle control technology, as summarized above, must be compared with recent trends in flight vehicle designs which place significantly greater demands and reliance on automatic controller designs. To illustrate, it is well known in the art that a number of favorable aircraft performance characteristics, e.g. improved maneuverability and greater fuel efficiency, are achieved by moving the center of gravity range toward the rear of the aircraft. Improved aircraft performance characteristics are also achievable by decreasing the size of certain control surfaces. For example, weight and trim drag can be reduced by decreasing tail size. Unfortunately, introduction of these design features increases aircraft instabilities. The frequencies of these instabilities are often such that the pilot is incapable of providing control inputs through the stick or control column to compensate. Thus, automatic control systems and methods with enhanced capabilities are needed to offset the increased stability problems of less inherently stable aircraft designs.

In the past, a number of approaches have been used in the design of flight control systems and methods and the control laws which they incorporate. Approaches range from simple damped systems which respond to short period perturbations to more complex systems that include pilot relief modes. Pilot relief modes are control features such as axis rotation rate commands with attitude or angle hold that allow the pilot, for example, to command the vehicle to climb at a constant rate of one thousand feet per minute.

These latter systems and methods provide reasonably good stability for unstable as well as stable flight vehicle designs. However, they have suffered from a number of objectionable characteristics. For example, following a momentary pilot command input, the control system or method may not automatically return the vehicle to its previously commanded trim conditions, such as steady horizontal flight or a constant climb rate.

These systems and methods may also have undesirable response characteristics when the vehicle experiences transient conditions such as windshear, speedbrake deployment, engine failure, or other disturbances to stable flight. For example, an aircraft controlling pitch attitude or flight path angle through the elevator will reduce speed and increase the angle of attack when encountering downdrafts or engine failures. This is a significant safety problem when flying at low speeds.

Thus, control systems and methods known in the art have generally failed to provide a capability for rapid, tailored, and integrated response to both pilot and selected sensor inputs while maintaining invariant handling qualities and stability characteristics for flight vehicles having a wide range of center of gravity locations and operating conditions.

It is an object of the present invention to provide a flight vehicle control system and method having rapid, tailored, and integrated response to pilot and sensor inputs, invariant or task-tailored handling qualities, and favorable stability characteristics for vehicles having a wide range of center of gravity locations.

It is further an object of the present invention to provide a flight vehicle control system and method in which pilot command input gradients (e.g. column force per g and column force per knot) are relatively invariant with respect to location of the center of gravity and are tailored to the flight phase.

It is still further an object of the present invention to provide a control law concept for uses including application to flight vehicles with unstable designs that furnishes maneuvering and trim characteristics as good as or better than those for current stable flight vehicle designs.

It is further an object of the present invention to provide a control law concept in which gain scheduling as a function of center of gravity location or stabilizer position is not required.

Additional objects and advantages of the invention will be set forth in the description which follows and in part will be obvious from the description, or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, the first preferred system embodiment of the flight control system of this invention uses input signals including normal acceleration ($n_z$), airspeed (V) and pilot command signal (P), and comprises first combining means for combining the airspeed (V) with the normal acceleration ($n_z$) to produce a feedback signal ($n_{zu}$), second combining means for combining the feedback signal ($n_{zu}$) with the pilot command signal (P) to produce a differential acceleration signal ($\Delta n_{zu}$), and means for controlling the flight vehicle in response to this differential acceleration signal ($\Delta n_{zu}$). It is further preferable that one or more additional transfer function applying means for applying transfer functions to selected signals be provided. For example, the first preferred system embodiment further comprises first transfer function applying means for applying a first transfer function to the differential acceleration signal ($\Delta n_{zu}$). This first preferred system embodiment further comprises second transfer function applying means for applying a second transfer function to the pilot command signal (P).

To further achieve the objects and also in accordance with the purpose of the invention as embodied and broadly described herein, a preferred method embodiment of this invention for controlling a flight vehicle uses input signals including normal acceleration ($n_z$), airspeed (V), and pilot command signal (P), and comprises a first step of combining the airspeed (V) with the normal acceleration ($n_z$) to produce a feedback signal ($n_{zu}$), a second step of combining the feedback signal ($n_{zu}$) with the feedforward command signal ($n_{zuc}$) to produce a differential acceleration signal ($\Delta n_{zu}$), and a third step of controlling the flight vehicle in response to the differential acceleration signal ($\Delta n_{zu}$). As with the first preferred system embodiment, it is further preferable that this method include substeps of applying selected transfer functions to various predetermined signals. For example, the second step may comprise a first substep of applying a first transfer function in the form of an integrator to the differential acceleration signal ($\Delta n_{zu}$). The second step may, in addition or in the alternative, comprise a second substep of applying a second transfer function to the pilot command signal (P) prior to combination with the feedback signal ($n_{zu}$).

Still further to achieve the objects of the invention and also in accordance with the purpose of the invention as embodied and broadly described herein, a second preferred system embodiment of the flight control system of this invention, also in the form of a pitch stability augmentation system, uses input signals including normal acceleration ($n_z$), airspeed (V), column force ($F_c$), trim integrator command ($T_c$), and supplementary performance parameters such as pitch axis rotation rate, longitudinal acceleration, and altitude rate (w). It comprises a feedback section comprising the first combining means for combining airspeed (V) with normal acceleration ($n_z$) to produce a feedback signal ($n_{zu}$). This second preferred system embodiment further comprises a feedforward section which comprises fourth combining means for combining the column force ($F_c$) with the trim integrator command ($T_c$) to produce a pilot command signal (P). The feedforward section further comprises second transfer function applying means for applying a second transfer function to the pilot command signal (P) to produce a feedforward command signal ($n_{zuc}$). The feedforward section still further comprises fourth transfer function applying means for applying a fourth transfer function to the pilot command signal (P) to produce an adjusted pilot command signal (P'), fifth transfer function applying means for applying a fifth transfer function to the feedforward command signal ($n_{zuc}$) to produce an adjusted feedforward command signal ($n'_{zuc}$), and fifth combining means for combining the adjusted pilot command signal (P') with the adjusted feedforward command signal ($n'_{zuc}$) to produce a feedforward compensator input signal ($n''_{zuc}$). The second preferred system embodiment also comprises second combining means for combining the feedback signal ($n_{zu}$) with the feedforward command signal ($n_{zuc}$) to produce a differential acceleration signal ($\Delta n_{zu}$), and first transfer function applying means for applying the first transfer function to the differential acceleration signal ($\Delta n_{zu}$) to produce the adjusted differential acceleration signal ($\Delta n'_{zu}$). The second preferred embodiment further comprises sixth combining means, referred to herein as the dynamic compensator, for combining the differential acceleration signal ($\Delta n_{zu}$), normal acceleration ($n_z$), supplementary performance parameters (w), airspeed (V), column force ($F_c$), and feedforward compensator input signal ($n''_{zuc}$), to provide a dynamic compensator output signal (DC). The system further comprises seventh combining means for combining the dynamic compensator output signal (DC) with the adjusted differential acceleration signal ($\Delta n'_{zu}$) to produce a dynamic flight control signal (DFC). In addition, the second preferred embodiment comprises means for controlling the flight vehicle in response to the dynamic flight control signal (DFC).

A second preferred method embodiment which corresponds to the second preferred system embodiment is also disclosed herein.

Broadly, a feedforward command signal comprising pilot commands (e.g. column force and trim integrator commands) is combined with a feedback signal comprising airspeed and normal acceleration to produce a dynamic flight control signal. Thus, the present invention combines a short period (normal acceleration or load factor and supplementary performance parameters) control loop with a long period (airspeed) control loop to create a control law which allows the control system to respond favorably and in an integrated fashion to both long and short period events. It furnishes command response shaping, gust disturbance rejection, and stability augmentation.

Any or all of the input signals, e.g. pilot command signal, airspeed and normal acceleration, and any or all of the output signals, e.g. dynamic flight control signal (DFC), may be appropriately adjusted by applying selected transfer functions to the respective signals.

BRIEF DESCRIPTION OF THE DRAWINGS

The accompanying drawings, which are incorporated in and constitute a part of the specification, illustrate preferred embodiments of the invention and, together with the general description given above and the detailed description of the preferred embodiments given below, serve to explain the principles of the invention.

DESCRIPTION OF THE PREFERRED EMBODIMENTS

Reference will now be made in detail to the present preferred embodiments of the invention as illustrated in the accompanying drawings.

The present invention comprises a plurality of combining means. The term combining means as used herein is to be broadly interpreted, and includes combination in the digital or binary sense so that it includes addition, subtraction, multiplication and division.

Figure 1:
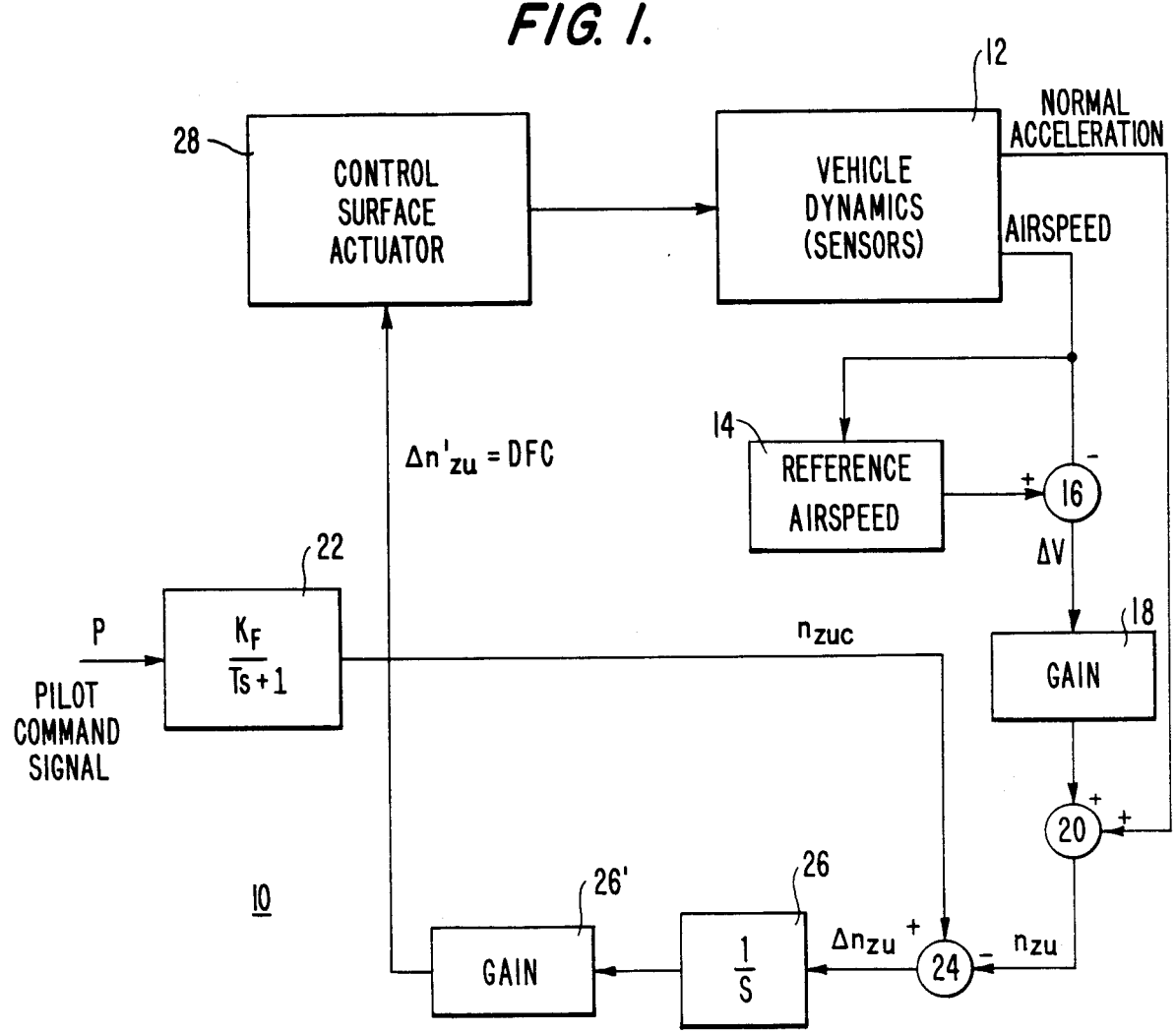
FIG. 1 is a schematic diagram of a longitudinal (pitch) stability control system incorporating the teachings of the present invention and representing a first preferred system embodiment of the flight control system of the present invention.

A first preferred system embodiment of the flight control system in the form of a pitch stability augmentation system is shown in FIG. 1 and is represented generally at 10. This flight control system receives inputs which include airspeed (V), normal acceleration ($n_z$), and pilot command signal (P) and provides control signals to an elevator control surface actuator 28.

The airspeed value used by the systems and methods of the present invention may take a variety of forms, including the instantaneous flight vehicle airspeed (V'), calibrated airspeed ($V_c$) or differential airspeed ($\Delta V$) Note that the term airspeed as used herein without modification may thus refer to any of the aforementioned airspeed quantities. This first preferred system embodiment uses a differential airspeed ($\Delta V$) which is produced by the system of this embodiment in the following manner. A vehicle airspeed sensor, located generally at 12 in FIG. 1, continuously provides an analog signal representing instantaneous air-speed. This signal is digitized in an analog-to-digital converter (not shown) and provided to a reference airspeed storage device 14 where it is stored as a reference airspeed ($V_o$).

Storage of an updated reference airspeed ($V_o$) can take place in a number of ways, e.g., when the system is engaged, either manually by the pilot or automatically when preset conditions are met, or storage may take place periodically. It will be understood that the storage of reference airspeed ($V_o$) values and the regulation of instantaneous airspeed signals (V') entering the system of the present invention may be performed by well-known interface and logic circuitry.

The invention includes third combining means for combining initial airspeed with instantaneous airspeed to produce a differential airspeed signal. As embodied herein, the third combining means comprises a junction 16 which receives the digitized instantaneous airspeed signal (V') from the vehicle sensor and compares this value with the current reference airspeed ($V_o$) to obtain a differential airspeed ($\Delta V$). A gain may be applied to the differential airspeed signal ($\Delta V$) by an amplifier 18. This gain may be set by the designer to appropriately balance or weight the effect of airspeed relative to normal acceleration on the system response.

The normal acceleration input ($n_z$) is also derived from a vehicle sensor such as a gyroscopic device, an accelerometer, or an inertial reference unit located at 12. This quantity may be understood by reference to FIG. 2, which shows an aircraft in stable horizontal flight in its symmetry plane upon which is superimposed a rectilinear coordinate system.

Flight vehicles regularly experience transient external forces which upset stable flight and create moments about one or more of the three principal axes of stable flight. Thus, the vehicle experiences an angular acceleration about its instantaneous center or axis of rotation. The linear normal acceleration experienced by a reference point located along an axis perpendicular to the axis of rotation is referred to herein as the normal acceleration ($n_z$).

The invention comprises first combining means for combining the differential airspeed signal ($\Delta V$) with the normal acceleration ($n_z$) to produce a feedback signal ($n_{zu}$). As embodied herein, the first combining means comprises a summing junction 20. In the pitch stability augmentation system of the first preferred system embodiment, normal acceleration ($n_z$) is measured by a vertical acceleration sensor.

In this first preferred system embodiment, first combining means 20 and third combining means 16, collectively, comprise a feedback section.

These combining means may comprise analog devices, such as summing amplifiers or transistors, or they may comprise digital devices, such as binary adder-subtractors, comparators, or shift registers in an arithmetic logic unit of a central processing unit.

The concept of a transfer function is used at several points throughout the system and method of the present invention as depicted in the preferred embodiments. The concept of a transfer function as used herein is to be interpreted broadly to include time lags or unit step functions, amplification (linear or non-linear), attenuation, ramp functions, integration and the like. Thus, the definition includes the concept of gain. These transfer functions in their various forms are typically expressed mathematically in Laplace transform notation and are introduced in the system by transfer function applying means.

These transfer function applying means may also take analog or digital form. Examples of analog means include linear amplifiers, capacitors, inductors, and resistors. Examples of digital means include binary adder-subtractors, comparators, inverters, controlled counters, and associated memory registers.

This first preferred system embodiment further includes a feedforward section which receives a pilot command signal (P) from an external source. This pilot command signal may represent a column force or stick force exerted by the pilot on the control column of the aircraft, or it may constitute a trim integrator command representing the setting or adjustment of a trim control located in the cockpit, or both. The concept of pilot command signal (P) as used herein is also to be broadly interpreted. Note that pilot-provided inputs need not be derived from a human source. For example, pilot-provided signals may be any command signals which are intended to command or are capable of commanding flight vehicle performance in a controlled fashion and which are provided from a source external to the system and method of the present invention. To illustrate, such signals could be derived from the output of a device with artificial intelligence capability or from a remote radio frequency source. Thus, they need not derive from a human pilot.

The system further comprises second transfer function applying means for applying a second transfer function to the pilot command signal (P). This second transfer function is used to smooth and shape the pilot command signal (P). In the first preferred system embodiment the second transfer function applying means takes the form of a first order lag transfer function at 22 having Laplace transform $$L[F(t)] = \frac{K_F}{Ts + 1}$$

where $K_F$ is a feedforward controller gain, T is a feedforward controller time constant, and s is the Laplace transform complex variable. The pilot command signal (P), having been transformed by the application of the second transfer function at 22, may be referred to as a feedforward command signal ($n_{zuc}$).

The invention may further comprise a second combining means for combining the feedback signal nzu with the pilot command signal P. As embodied herein, the second combining means comprises a junction 24 where the feedback signal nzu is subtracted from feedforward command signal nzuc to produce differential acceleration signal $\Delta n_{zu}$.

The invention also includes a first transfer function applying means for applying a first transfer function to the differential acceleration. As embodied herein and as shown in FIG. 1, this first transfer function applying means preferrably comprises an integrator 26 having Laplace transform $$L[F(t)] = 1/s$$

where s is the Laplace transform complex variable. The first transfer function may further comprise a gain, shown in FIG. 1 at 26', the value of which is based at least in part on the magnitude of the signal required to influence control surface actuator 28. The transformed signal emerging from first transfer function applying means 26 may be referred to as an adjusted differential acceleration signal ($\Delta n'_{zu}$).

This adjusted differential acceleration signal ($\Delta n'_{zu}$), in this embodiment, constitutes a dynamic flight control signal (DFC). The invention further comprises means for controlling the flight vehicle in response to the differential acceleration signal. Such means for controlling the flight vehicle may produce mechanical movement of control surface actuators, regulation of power to servo mechanisms, positioning of hydraulic or pneumatic valves or actuators, storage of the dynamic flight control signal (DFC) for subsequent use, or any other action by which the dynamic flight control signal (DFC) may be used to influence flight vehicle performance characteristics. Thus, means for controlling the flight vehicle in response to the dynamic flight control signal (DFC) might include servo amplifiers or transducers for hydraulic or pneumatic servos, power regulator inputs, power supply inputs, or storage devices. The dynamic flight control signal (DFC) might be provided to the control means by resistive, capacitive, or inductive coupling, fiber optic cable, or other transmission means. For example, FIG. 1 shows the dynamic flight control signal (DFC) to be delivered to control surface actuator 28, which for the pitch stability augmentation system is the elevator actuator, which in turn raises or lowers the nose of the aircraft. As embodied herein, the means for controlling the flight vehicle in response to the differential acceleration signal thus comprises actuator 28. As noted above, however, the preferred embodiment is not limited thereby.

The subsequent effect of the dynamic flight control signal (DFC) on the control and performance of the flight vehicle is manifested in the vehicle dynamics, that is, how the vehicle actually flies. Such vehicle dynamics and sensors which sense such flight performance are indicated generally at 12. Thus, airspeed (V) and normal acceleration ($n_z$) as determined by vehicle sensors, and which serve as system inputs in the first preferred system embodiment, are thereby influenced and serve as system feedback.

In the first preferred system embodiment, transfer functions may be applied at a plurality of points. Three such transfer functions, 18, 22 and 26, have been discussed. It will be recognized by those practicing in the art that transfer functions may be applied at other points in the system. For example, a balancing transfer function might be applied to the normal acceleration ($n_z$) by a transfer function applying means located along the normal acceleration ($n_z$) path between the vehicle sensor, generally at 12, and first combining means 20.

In addition to the flight control system previously described, the present invention includes a first preferred method embodiment for controlling a flight vehicle using inputs which include the same inputs as the flight control system of the first preferred system embodiment, namely, normal acceleration ($n_z$), airspeed (V) and pilot command signal (P). This method, which may be understood by reference to the first preferred system embodiment as depicted in FIG. 1, is described as follows.

As in the first preferred system embodiment, the first preferred method embodiment comprises the combination of a feedforward signal with a feedback signal to produce a flight control signal, represented in FIG. 1 as the adjusted differential acceleration signal ($\Delta n'_{zu}$) and, equivalently in this embodiment, as the dynamic flight control signal (DFC).

The first step of this method comprises subtracting the initial or reference airspeed ($V_o$) from the sensor-derived instantaneous airspeed (V') to produce a differential airspeed signal ($\Delta V$). Implementation of this first step would be carried out in the first preferred system embodiment of the present invention by junction 16 in FIG. 1. A substep of this first step comprises application of a transfer function, preferably a gain, at 18 to the differential airspeed signal ($\Delta V$).

The second step of the first preferred method embodiment comprises combining, here summing, the differential airspeed signal ($\Delta V$) with normal acceleration ($n_z$) to produce a feedback signal ($n_{zu}$). This second step of the present method corresponds to junction 20 of the first preferred system embodiment.

The third step of this embodiment comprises combining the feedback signal ($n_{zu}$) with the pilot command signal (P), preferably subtracting the former from the latter, to produce a differential acceleration signal ($\Delta n_{zu}$). This combination corresponds to junction 24 in FIG. 1. This third step preferably includes two substeps. In the first substep, the first transfer function is applied to the differential acceleration signal ($\Delta n_{zu}$). This first transfer function takes the form of an integrator having Laplace transform $$L[f(t)] = 1/s$$

where s is the Laplace transform complex variable. The differential acceleration signal ($\Delta n_{zu}$), after application of the first transfer function, may be referred to as the adjusted differential acceleration signal ($\Delta n'_{zu}$). This first step corresponds to integrator 26. The first transfer function may further comprise a gain represented generally at 26' in FIG. 1. The form and value of this gain will depend at least in part on the requirements posed by the hardware and demands of the particular application.

The second substep of the third step comprises applying the second transfer function to the pilot command signal (P) prior to combination with the feedback signal ($n_{zu}$). In selecting a specific transfer function for this signal, advantage may be taken of the natural frequency separation between the normal acceleration ($n_z$) and the general change in airspeed exhibited by flight vehicles. The normal acceleration ($n_z$) responds quickly to control surface motion while instantaneous airspeed (V')

changes relatively slowly. For example, a steady column force exerted by the pilot commands a substantially immediate normal acceleration, followed by a delayed change in airspeed. In the first preferred method embodiment, this second transfer function preferably takes the form of a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable, all as described above. The coefficient $K_F$ has units of g/lb so that the pilot command signal (P) having units of pounds, is converted to normal acceleration, measured in g's. The time constant T has units of seconds, and may be selected by the designer based on the flight vehicle's response characteristics. As an example, T would be relatively small for a fighter or attack aircraft whereas it would be relatively large for a bomber or transport aircraft. For transport aircraft, $K_F$ typically has a value in the range of 1/40 to 1/30, and T typically has a value of 1.0 seconds. Thus, a 30 lb. to 40 lb. column force exerted by the pilot creates a steady-state filter output signal of unity. This step corresponds to second transfer function applying means 22 in FIG. 1. The pilot command signal (p), after having been adjusted by the second transfer function, may be referred to as the feedforward command signal ($n_{zuc}$).

The fourth step of the present invention comprises providing the adjusted differential acceleration signal ($\Delta n'_{zu}$), also referred to in this embodiment as the dynamic flight control signal (DFC), to the means for controlling the flight vehicle, as described above.

The operation of the first preferred method embodiment of the present invention for controlling a flight vehicle as carried out by the first preferred system embodiment as described above, will now be described with reference to FIG. 1.

Figure 2:
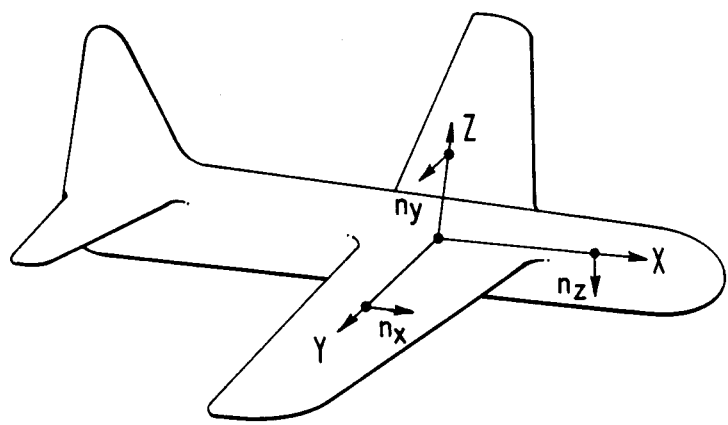
FIG. 2 shows an aircraft in stable horizontal flight in its symmetry plane upon which is superimposed a rectilinear coordinate system.

Normal acceleration ($n_z$) measured vertically perpendicular to the x,y plane of FIG. 2 (positive sense in the up direction, opposite of the z axis), instantaneous airspeed (V'), and other vehicle dynamics are measured by sensors located at various points on and in the flight vehicle. The first preferred system embodiment of the present invention receives an instantaneous airspeed signal (V') from one or more of these sensors at some point prior to initiation of the operation of the first preferred method embodiment of the present invention and stores this airspeed value at a predetermined time as the initial or reference airspeed ($V_o$). As the first preferred system and method embodiments of the present invention operate, this instantaneous airspeed value (V') is subtracted from the initial airspeed signal ($V_o$) at junction to produce a differential airspeed signal ($\Delta V$). The normal acceleration signal ($n_z$) as measured by vehicle sensors is combined with this differential airspeed signal ($\Delta V$) at junction 20 to produce the feedback signal ($n_{zu}$). For a fixed value of normal acceleration ($n_z$), an increase in the differential airspeed signal ($\Delta V$) translates through junction 20 directly into an increase in the value of the feedback signal ($n_{zu}$). This feedback signal translates directly through junction 24 to negatively influence (decrease) the differential acceleration signal ($\Delta n_{zu}$) emanating therefrom, thus negatively influencing flight vehicle response, e.g. to decrease the deflection of the control surface. Alternatively, a decrease in differential airspeed signal ($\Delta V$) translates through the same path to positively influence flight vehicle response, e.g. to increase the deflection of the control surface.

Relaxing the assumption of zero normal acceleration ($n_z$), and assuming that the differential airspeed signal ($\Delta V$) is fixed at zero, an increase in normal acceleration ($n_z$) will translate through junction 20 to increase the value of the feedback signal ($n_{zu}$), which similarly serves to decrease the differential acceleration signal ($\Delta n_{zu}$) emanating from junction 24. A decrease in normal acceleration ($n_z$) translates through the system in similar fashion.

Allowing both the differential airspeed signal ($\Delta V$) and normal acceleration ($n_z$) to vary, an increase in the value of both signals will translate into a negative response of the flight control system, i.e. a decrease in the value of the differential acceleration signal ($\Delta n_{zu}$). Conversely, decreases in the value of both signals will positively influence the response of the flight control system. In similar fashion, an increase in one of these signals will be offset by a decrease in the other signal. The values of each of these signals may be appropriately adjusted by selected transfer functions, for example, to influence their relative weighting. Such a transfer function in the form of a gain applied to the differential airspeed signal ($\Delta V$) is shown at 18; a corresponding transfer function for normal acceleration ($n_z$) is not shown in FIG. 1.

External forces acting on the flight vehicle, such as windshears, gusts, and engine failures, will be detected by flight vehicle sensors and will be transmitted to the flight control system of the present invention as described above. The feedback section of the first preferred system embodiment of the present invention, represented in FIG. 1 by junctions means 20 and 16, respectively, will thus incorporate these sensor input signals into the dynamic flight control signal (DFC) capable of instituting appropriate flight vehicle response to the transient disturbances.

When the pilot commands a maneuver of the flight vehicle, the command is translated in the form of a pilot command signal (P) to which a second transfer function comprising an appropriate time lag is applied at second transfer function applying means 22 and which is subsequently combined at junction 24 to directly influence the differential acceleration signal ($\Delta n_{zu}$). Thus pilot commands are translated directly into flight control signals which influence flight vehicle response. Since vehicle dynamics, which are accommodated through the feedback section, are directly combined with pilot commands, an integrated signal is produced which simultaneously responds to both. The advantage of the relatively rapid response of the feedback section is thereby combined with the longer duration requirements of the pilot command, i.e. feedforward section. The system is sufficiently flexible to allow further response shaping, for example, by applying appropriate transfer functions to the differential acceleration signal ($\Delta n_{zu}$) at first transfer function applying means 26, as previously described.

Figure 3:
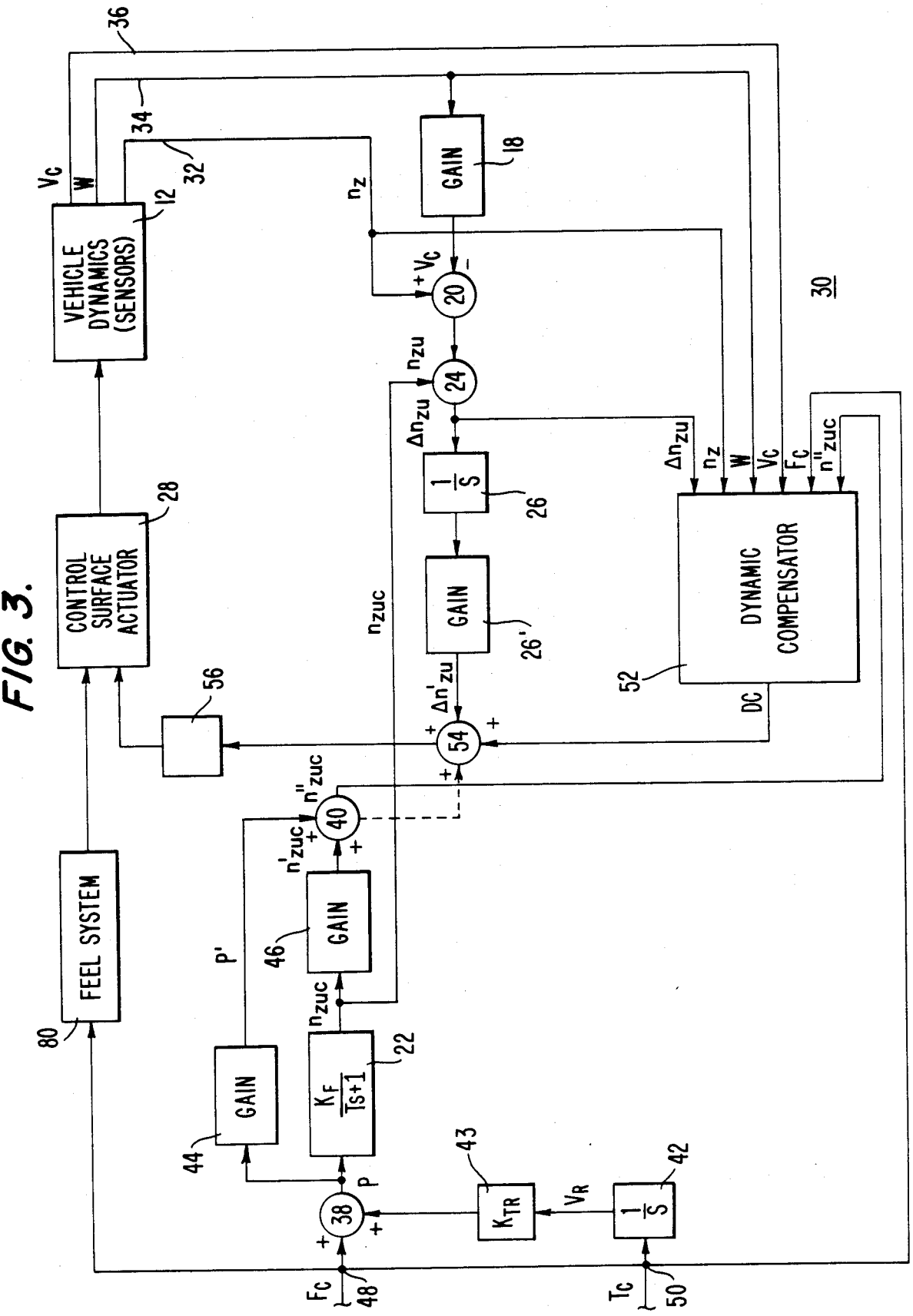
FIG. 3 is a schematic diagram of a second longitudinal (pitch) control system also incorporating the teachings of the present invention and representing a second preferred system embodiment of the flight control system of the present invention.

A second preferred embodiment of the flight control system of the present invention, also referred to herein as the second preferred system embodiment, is shown in FIG. 3 and represented generally as 30. While this system contains the elements and features of the first preferred system embodiment and also comprises a pitch stability augmentation system, it adds additional elements and features which serve to refine and improve its performance over the first preferred system embodiment. As in the first preferred system embodiment, the system of FIG. 3 includes feedback and feedforward sections.

The system receives an airspeed value (here calibrated airspeed ($V_c$)), normal acceleration ($n_z$), column force ($F_c$), and trim integrator command ($T_c$), and supplementary performance parameters (w) as externally supplied inputs. Depending on the particular application, supplementary performance parameters could include pitch axis rotation rate, longitudinal acceleration, and vertical speed or altitude rate.

Calibrated airspeed ($V_c$), normal vertical acceleration ($n_z$), and supplementary performance parameters (w) are provided by vehicle sensors. Column force ($F_c$) and trim integrator command ($T_c$) are pilot-provided inputs. The column force ($F_c$) represents the force applied to the control column by the pilot. The trim integrator command ($T_c$) represents a substitute for the column force command allowing the pilot to command long term speed changes without maintaining a steady column force. The system provides a dynamic flight control signal (DFC) which is provided to a means for controlling the flight vehicle.

Referring to FIG. 3, normal acceleration ($n_z$), supplementary performance parameters (w), and calibrated airspeed ($V_c$) are received by the second preferred system embodiment at external interface points 32, 34, and 36, respectively. Junction 20 is used to subtract calibrated airspeed ($V_c$) from normal acceleration ($n_z$) which results in a feedback signal ($n_{zu}$). Prior to this combination, a transfer function may be applied to either the normal acceleration signal ($n_z$) or calibrated airspeed ($V_c$) or both. In the preferred system embodiment depicted in FIG. 3, a gain is applied to calibrated airspeed ($V_c$) at 18.

The invention comprises fourth combining means for combining the column force ($F_c$) with the trim integrator command ($T_c$) to produce a pilot command signal (P). As embodied herein, the fourth combining means comprises junction 38. Referring to the feedforward section, system 30 receives inputs comprising column force ($F_c$) and trim integrator command ($T_c$) at interface points 48 and 50, respectively. These two inputs are summed at junction 38 to produce a pilot command signal (P). Prior to summation, transfer functions may be applied to either or both of these signals as is appropriate for the specific application. In the preferred embodiment depicted in FIG. 3, the invention comprises third transfer function applying means for applying a third transfer function to the trim integrator command ($T_c$). As embodied herein the third transfer applying means comprises an integrator 42 having Laplace transform $$L[f(t)] = 1/s$$

where s is the Laplace transform complex variable. It is further preferred to provide a gain $K_{TR}$ by an amplifier 43 as shown in FIG. 3.

Second transfer function applying means is provided for transforming the pilot command signal (P) into a feedforward command signal ($n_{zuc}$). This transformation can be used to smooth the pilot command signal (P) and introduce appropriate time lags. This transfer function applying means in the preferred embodiment takes the form of a first order lag function 22 having Laplace transform where $K_F$ is a feedforward controller gain, T is a feedforward time constant, and s is the Laplace transform complex variable.

Second combining means 24 is used to subtract the feedback signal ($n_{zu}$) from the feedforward command signal ($n_{zuc}$) to produce a differential acceleration signal ($\Delta n_{zu}$).

In this second preferred system embodiment, the first transfer function is applied to this differential acceleration signal ($\Delta n_{zu}$) by first transfer function applying means 26 to produce an adjusted differential acceleration signal ($\Delta n'_{zu}$). This first transfer function comprises an integrator having Laplace transform $$L[f(t)] = 1/s$$

where s is the Laplace transform complex variable. The first transfer function applied at 26 is selected by the designer in accordance with the demands of the specific application and may further comprise an appropriate gain, shown in FIG. 3 as 26'.

This second preferred system embodiment is refined over the first preferred embodiment depicted in FIG. 1 by the addition of a sixth combining means for combining the differential acceleration signal $\Delta n_{zu}$, the normal acceleration signal $n_z$, airspeed V, and the feedforward compensator input signal $n''_{zuc}$ to produce a dynamic compensator output signal DC. As embodied herein, the sixth combining means comprises a dynamic compensator 52, which serves to refine the overall output of the system by providing command responses to a selected number of internal and external inputs, as described below.

Dynamic compensator 52 furnishes additional, and refined, stability and response characteristics. It provides extra feedback compensation (in addition to the feedback portion of the first preferred system embodiment as previously described) to eliminate transient oscillations and give good stability margins. Dynamic compensator 52 also provides robustness (invariance) of the flight vehicle behavior as the dynamic characteristics of the vehicle change with variations in center of gravity location, airspeed, and altitude.

Dynamic compensator 52 functions by constructing a matrix or array of input signals, applying a set of stored arrays to this input array through a set of matrix operations described below to produce an output array, translating this output array into an output signal, and adjusting the stored arrays for the next iteration (known as gain scheduling). Thus, it involves a number of matrix operations. Dynamic compensator 52 therefore may comprise a set of storage registers for storing the arrays, an arithmetic logic unit with binary adder-subtractors and comparators for conducting the mathematical operations, address registers, pointers, and other digital hardware commonly found in the central processors of commercial or military digital flight computers. Dynamic compensator 52 may also be implemented in analog form in which case the device may comprise storage means such as capacitors and inductors, and mathematical operator means such as linear amplifiers, transistors, and variable resistors. The design of dynamic compensator 52 is dependent upon the specific application and may be provided by techniques well known to those skilled in the art.

Dynamic compensator 52 directly receives inputs from external input signals including calibrated airspeed ($V_c$), supplementary performance parameters, normal acceleration ($n_z$), and column force (Fc). The differential acceleration signal ($\Delta n_{zu}$) is also provided to dynamic compensator 52 as an input.

A feedforward compensator input ($n''_{zuc}$) is provided from the feedforward section to dynamic compensator 52 and is produced in the following manner. The pilot command signal (P) as it emerges from junction 38 is tapped and is acted upon by a fourth transfer function applying means, for applying a fourth transfer function to pilot command signal P to produce an adjusted pilot command signal P'. In the second preferred embodiment the fourth transfer function applying means comprises an amplifier 44 supplying a gain produce an adjusted pilot command signal (P'). Similarly, the invention includes a fifth transfer function applying means for applying a fifth transfer function to the feedforward command signal ($n_{zuc}$) to produce an adjusted feedforward command signal ($n'_{zuc}$). As embodied herein, the fifth transfer applying means comprises an amplifier 46. The adjusted pilot command signal (P') is then coupled to a fifth combining means for combining the adjusted pilot command signal P' with the adjusted feedforward command signal ($n'_{zuc}$). As embodied herein, the, fifth combining means comprises junction 40 to which is supplied P' and $n'_{zuc}$ to produce a feedforward compensator input signal ($n''_{zuc}$) to dynamic compensator 52 as an input generally representing the feedforward section, or an integrated pilot command.

Dynamic compensator 52 in the continuous time domain has state equations of the form $$\frac{dx(t)}{dt} = A\,x(t) + B\,u(t)$$

where x(t) is the dynamic compensator state vector of dimension n (the vector of internal state variables of the dynamic compensator), y(t) is the output vector of dimension p (the vector of outputs leaving the dynamic compensator block), u(t) is the input vector of dimension m (the vector of input signals entering the dynamic compensator block), A is a block diagonal nxn matrix, B is an nxm matrix, C is a pxn matrix, and D is a pxm matrix (i.e. A,B,C and D are matrices (arrays) of constant coefficients multiplying the vectors shown). In this preferred embodiment, n=9, m=6, p=1 and D is a zero matrix.

These state equations may be discretized in a number of alternative ways. The "state-transition method" was selected here. For a computer "frame time" or "frame" $\Delta t$, these equations take the form $$x(t+\Delta t) = \bar{A} x(t) + \bar{B} u(t)$$

$$y(t) = C \times (t) + D u(t)$$

where $$\bar{A} = \exp(A \Delta t)$$

and $$\bar{B} = \int_0^{\Delta t} \exp(A_\tau)\, d_\tau\, B$$

The expression exp ( ) is used here to denote the matrix exponential function.

A dynamic compensator output signal (DC) is then provided to a seventh combining means for combining the dynamic compensator output signal DC with the adjusted differential acceleration signal ($\Delta n'_{zu}$) to produce the output of the system, the dynamic flight control signal (DFC). As embodied herein, the seventh combining means comprises junction 54. Dynamic flight control signal DFC is then used to control the flight vehicle or subparts thereof, e.g. control surface actuators, hydraulic or pneumatic actuators, or other transducers, or stored by storage means, all as described above and generally represented in FIG. 3 at 28. Prior to use of this signal in controlling the flight vehicle a sixth transfer function may be applied by sixth transfer function applying means 56 to provide final adjustments to the dynamic flight control signal (DFC).

FIG. 3 shows an optional "feel system" 80 which can provide the column force signal ($F_c$), directly to control surface actuator 28. Feel system 80 can override the invention and translate pilot commands directly to control surface actuator 28.

The second preferred method embodiment of the present invention will now be described with reference to FIG. 3. This method receives inputs including the same inputs as the second preferred system embodiment. These inputs comprise normal acceleration ($n_z$), calibrated airspeed ($V_c$), column force ($F_c$), trim integrator command ($T_c$) and axis rotation rate (q).

The first step of this method comprises combining the calibrated airspeed ($V_c$) with the normal acceleration ($n_z$) to produce a feedback signal ($n_{zu}$). Preferably this combination comprises a subtraction step. This subtraction takes place in the second preferred system embodiment of FIG. 3 at first combining means 20. This first step may include a first substep of applying a transfer function to the calibrated airspeed ($V_c$). This transfer function preferrably comprises a gain and corresponds to the gain at 18 in FIG. 3.

The second step of this method comprises combining the column force ($F_c$) with the trim integrator command ($T_c$) to produce a pilot command signal (P). This combination corresponds to the fourth combining means 38 in FIG. 3.

Prior to this combination, a substep of the second step comprises applying a third transfer function to the trim integrator command ($T_c$) in the form of an integrator having Laplace transform $$L[f(t)] = 1/s$$

where s is the Laplace transform complex variable.

The trim integrator generally produces a signal equivalent to the column force command ($F_c$), allowing the pilot to change airspeed without maintaining a steady force on the column. The pilot command signal (P) may be represented by the expression (in Laplace transform notation)

$$P(s) = F_c(s) + K_{TR} \cdot V_R$$

where $K_{TR}$ is a trim integrator gain and $V_R$ is the reference airspeed given by the expression (in Laplace transform notation)

$$V_R(s) = \frac{1}{s} \cdot T_c(s)$$

$T_c(s)$ is the trim integrator command input, which preferably is produced by the pilot pushing a switch or button $T_c(s)$ to produce a signal which goes to zero when the switch or button is released. The change in the reference airspeed ($V_R$) is thus proportional to the length of time the switch or button is depressed. If in a particular system application $K_{TR} = -\frac{1}{3}$, then a one pound column force will equal a three knot change in airspeed.

The third step comprises applying a second transfer function to the pilot command signal (P) to produce a feedforward command signal ($n_{zuc}$). Application of this second transfer function corresponds to second transfer function applying means 22 in FIG. 3. In this embodiment, this second transfer function takes the form of a first ordered lag transfer function having Laplace transform
where $K_F$ is a feedforward controller gain, T is a feedforward controller time constant, and s is the Laplace transform complex variable. Thus, the feedforward command signal ($n_{zuc}$) takes the form (in Laplace transform notation)

$$n_{zuc} = \frac{K_F}{(Ts + 1)} [F_c(s) - \tfrac{1}{3} V_R(s)]$$

The fourth step comprises combination of the feedback signal ($n_{zu}$) from the feedforward command signal ($n_{zuc}$), preferably subtracting the former from the latter, to produce a differential acceleration signal ($\Delta n_{zu}$). This step corresponds in FIG. 3 with second combining means 24.

The fifth step comprises applying the first transfer function to the differential acceleration signal ($\Delta n_{zu}$) to produce an adjusted differential acceleration signal ($\Delta n'_{zu}$). In the second preferred method embodiment, this first transfer function takes the form of an integrator having Laplace transform $$L[f(t)] = 1/s$$

where s is the Laplace transform complex variable. Application of this specific transfer function may be viewed as a substep.

The sixth step of this method comprises applying a fourth transfer function to the pilot command signal (P) to produce an adjusted pilot command signal (P'). This fourth transfer function is preferably a gain, and corresponds to amplifier 44 in FIG. 3.

The seventh step comprises applying a fifth transfer function to the feedforward command signal ($n_{zuc}$) to produce an adjusted feedforward command signal ($n'_{zuc}$). This fifth transfer function comprises a gain in this preferred method embodiment and corresponds to amplifier 46 of FIG. 3.

The eighth step comprises combining the adjusted pilot command (P') with the adjusted feedforward command signal ($n'_{zuc}$) to produce a feedforward compensator input signal ($n''_{zuc}$). This step corresponds to junction 40 of FIG. 3. At this point it may be seen that the fourth and fifth transfer functions may be approximately set to balance or weight the relative influence of the pilot command signal (P) and the adjusted feedforward command signal ($n'_{zuc}$).

The ninth step corresponds generally to the function of dynamic compensator 52 of FIG. 3. This step comprises combining the differential acceleration signal ($\Delta n_{zu}$), the normal acceleration ($n_z$), the supplementary performance parameters (W), the calibrated airspeed ($V_c$), the column force ($F_c$), and the feedforward compensator input signal ($n''_{zuc}$) to produce a dynamic compensator output signal (DC). As described above, dynamic compensator 52 furnishes additional and refined stability and response characteristics. This step generally comprises constructing an input vector, denoted u(t), in which one value for each of the above six quantities is placed. The dynamic compensator contains a set of four constant coefficient matrices, denoted A, B, C and D. The dynamic compensator also includes a state vector, denoted x(t), which represents an adjustable set of multipliers which are periodically adjusted to reflect changes in the input variables over time. This state vector changes over time according to the differential equation (in matrix form)

$$y(t) = Cx(t) + Du(t)$$

When dynamic compensator 52 receives values for the input variables listed above and constructs its input vector u(t), it calculates an output vector, denoted by y(t) according to the matrix equation $$y(t) = Cx(t) + Du(t)$$

In the preferred embodiment, y(t) is a scalar quantity.

$$y(t) = DC$$

The tenth step of the second preferred method embodiment comprises combining the dynamic compensator output signal (DC) with the adjusted differential acceleration signal ($\Delta n'_{zu}$) to produce a dynamic flight control signal (DFC). This step corresponds to the seventh combining means 54 in FIG. 3.

An eleventh step comprises controlling the flight vehicle in response to the dynamic flight control signal (DFC). This step may include a substep of applying a sixth transfer function 56 to the dynamic flight control signal (DFC) prior to its use in controlling the flight vehicle. In this preferred embodiment, this sixth transfer function comprises a gain.

A digital implementation of the first preferred system embodiment will now be described. It will be understood that the system may be realized as an analog system (consisting of elements such as resistors capacitors, and operational amplifiers) or as a digital system (consisting of discrete logic elements or comprising a digital flight computer and software). The advantage of analog systems is their inherent time-continuous operation. Digital implementation, however, is generally preferred because of the flexibility offered by software. Digital systems are time-discrete so that input signals must be sampled and the sample then processed. Output is in the form of discretized or digitized signals which are produced periodically in discrete "frame time" increments ($\Delta t$). The frame time in the digital implementation of the present invention is on the order of 20 to 50 milliseconds.

The present invention may be practiced using a number of conventional digital flight computers known in the art. Examples include the Honeywell 5301, the General Electric MCP701A, and other flight computers having an instruction set architecture meeting the standards of MIL-STD-1750A. Each of these devices contains combining means (e.g., binary adder-subtractors and associated memory registers) and transfer function applying means (e.g., adder-subtractors, controlled counters, inverters, and associated memory registers) within the central processing unit. The first preferred system embodiment will now be discussed as it relates to implementation in such a digital flight computer.

The first preferred system embodiment comprises three separate junctions 16, 20 and 24. Junction 20 used to sum two digital signals while junctions 24 and 16, respectively, are used to subtract one digital signal from another. In the digital implementation of the system of the present invention, each of these junctions comprises a binary adder-subtractor and associated storage registers. The subtracting means may comprise a comparator.

The system receives external inputs representing instantaneous airspeed (V) and normal vertical acceleration ($n_z$) in the form of digitized signals. Since sensor signals are typically analog, these signals may require transformation using an analog-to-digital converter. An external buffer may be used to receive, store, and time-tag the signals. The initial airspeed ($V_o$), which is stored within the system of the first preferred embodiment in a storage means (such as a register in random access memory), is subtracted from the digitized instantaneous airspeed (V') by adder-subtracter 16 in the arithmetic-logic unit (ALU). The result of this operation is the differential airspeed signal ($\Delta V$).

The gain applied at 18 comprises a binary adder-subtractor and one or more memory registers of the ALU. In the first preferred system embodiment, the transfer function to be applied at 18 is a constant gain. Thus, the gain value is stored in a memory register and is multiplied (binary addition) by the differential airspeed ($\Delta V$) signal in the ALU.

At this point, the digitized normal acceleration signal ($n_z$) is read from its buffer register to the ALU, where it is combined in the binary adder-subtractor 20 with the adjusted differential airspeed signal ($\Delta V'$) to produce the feedback signal ($n_{zu}$). This value may be stored for subsequent use or further processed directly, as specified below.

The pilot command signal (P) is received at an external interface by a buffer where it may be stored in a buffer register or transferred directly to the ALU. It is assumed that the pilot command signal (P) is in digital form. Whether stored in a buffer or used directly, the pilot command signal (P) is first sent to the ALU where the second transfer function is applied. Since this second transfer function comprises a first order lag transfer function in the first preferred system embodiment, the second transfer function applying means 22 comprises a storage register, a binary adder-subtractor, and a controlled counter, all in the ALU. A new value for this second transfer function, i.e., multiplier value, is calculated during each frame. The multiplier value is calculated in the ALU and multiplied by the value of the pilot command signal (P) to produce the feedforward command signal ($n_{zuc}$). The system may continue processing this value or store it in a storage register for subsequent processing.

Junction 24 comprises a binary adder-subtractor or comparator in the ALU. The feedback signal ($n_{zu}$) and the feedforward command signal ($n_{zuc}$) are transferred to the adder-subtractor or comparator where the feedback signal is subtracted from the feedforward command signal ($n_{zuc}$) to produce the differential acceleration signal ($\Delta n_{zu}$).

The first transfer function applying means 26 comprises a digital integrator such as a controlled counter. It prevents passage of the differential acceleration signal ($\Delta n_{zu}$) until the time specified by the parameter of the unit step transfer function (integrator) has been reached.

The adjusted differential acceleration signal ($\Delta n'_{zu}$) (combined with output DC from dynamic compensator 52) is provided through transfer means 56 to the input lead of a servo amplifier. Note that the differential acceleration signal ($\Delta n_{zu}$) is in digital form as it is provided to the servo amplifier. It may be necessary to convert the signal to analog using a digital-to-analog converter prior to delivery to the servo amplifier. The differential acceleration signal ($\Delta n_{zu}$) may be provided from the ALU or a storage means by a conductor, capacitive or inductive coupling, fiber optic cable, or other transmission means.

It will be recognized that, while two preferred system embodiments and two preferred method embodiments have been disclosed herein, the present invention is not necessarily limited thereby, and modifications may be made thereto without departing from the present invention. For example, the present invention is applicable to missiles, helicopters, unconventional aircraft, and other types of flight vehicles in addition to conventional aircraft.

What is claimed is:

1. A flight control system using input signals including normal acceleration ($n_z$), airspeed (V), and pilot command signal (P), said system comprising:
   first combining means for combining airspeed (V) with normal acceleration ($n_z$) to produce a feedback signal ($n_{zu}$);
   second combining means for combining said feedback signal ($n_{zu}$) with the pilot command signal (P) to produce a differential acceleration signal ($\Delta n_{zu}$);
   means for applying an integrator having Laplace transform $$L[f(t)] = 1/s$$

to said differential acceleration signal ($\Delta n_{zu}$) to produce an adjusted differential acceleration signal ($\Delta n'_{zu}$), s being the Laplace transform complex variable; and
   means for controlling the flight vehicle in response to said adjusted differential acceleration signal ($\Delta n'_{zu}$).

2. A flight control system as recited in claim 1, further comprising second transfer function applying means for applying a second transfer function to the pilot command signal (P).

3. A flight control system as recited in claim 2, wherein said second transfer function applying means comprises means for applying a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable.

4. A flight control system using input signals including normal acceleration ($n_z$), initial airspeed ($V_o$), instantaneous airspeed (V') and pilot command signal (P), said system comprising:

third combining means for combining the initial airspeed ($V_o$) with the instantaneous airspeed (V') to produce a differential airspeed signal ($\Delta V$);

first combining means for combining said differential airspeed signal($\Delta V$) with the normal acceleration ($n_z$) to produce a feedback signal ($n_{zu}$);

second combining means for combining said feedback signal ($n_{zu}$) with the pilot command signal (P) to produce a differential acceleration signal ($\Delta n_{zu}$);

means for applying an integrator having Laplace transform
$L[f(t)] = 1/s$ to said differential acceleration signal ($\Delta n_{zu}$) to produce an adjusted differential acceleration signal ($\Delta n'_{zu}$), s being the Laplace transform complex variable; and means for controlling the flight vehicle in response to said adjusted differential acceleration signal ($\Delta n'_{zu}$).

5. A flight control system as recited in claim 4, further comprising second transfer function applying means for applying a second transfer function to the pilot command signal.

6. A flight control system as recited in claim 5, wherein said second transfer function applying means comprises means for applying a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable.

7. A flight control system for controlling a flight vehicle using input signals including normal acceleration ($n_z$), airspeed (V), and pilot command signal (P), said system comprising:

a feedback section comprising first combining means for combining the airspeed (V) with the normal acceleration ($n_z$) to produce a feedback signal ($n_{zu}$);

a feedforward section comprising second transfer function applying means for applying a second transfer function to the pilot command signal (P) to produce a feedforward command signal ($n_{zuc}$);

second combining means for combining said feedback signal ($n_{zu}$) and said feedforward command signal ($n_{zuc}$) from said feedback and said feedforward sections, respectively, to produce a differential acceleration signal ($\Delta n_{zu}$);

first transfer function applying means for applying an integrator having a Laplace transform
$L[f(t)] = 1/s$ to said differential acceleration signal ($\Delta n_{zu}$) to produce an adjusted differential acceleration signal ($\Delta n'_{zu}$), s being the Laplace transform complex variable; and means for controlling the flight vehicle in response to said adjusted differential acceleration signal ($\Delta n'_{zu}$).

8. A flight control system as recited in claim 7, wherein:

said pilot command signal (P) comprises a column force ($F_c$);

said pilot command signal (P) further comprises trim integrator command ($T_c$); and said feedforward section further comprises fourth combining means for combining said column force ($F_c$) and said trim integrator command ($T_c$) to produce said pilot command signal (P).

9. A method for controlling a flight vehicle using input signals including normal acceleration ($n_z$), airspeed (V), and pilot command signal (P), said method comprising:

a first step of combining the airspeed (V) with the normal acceleration ($n_z$) to produce a feedback signal ($n_{zu}$);

a second step of combining said feedback signal ($n_{zu}$) with the pilot command signal (P) to produce a differential acceleration signal ($\Delta n_{zu}$);

a third step of applying an integrator having Laplace transform
$L[f(t)] = 1/s$ to said differential acceleration signal ($\Delta n_{zu}$) to produce an adjusted differential acceleration signal ($\Delta n'_{zu}$), s being the Laplace transform complex variable; and a fourth step of controlling the flight vehicle in response to said adjusted differential acceleration signal ($\Delta n'_{zu}$).

10. A method for controlling a flight vehicle as recited in claim 9, wherein said second step comprises a second substep of applying a second transfer function to the pilot command signal (P) prior to combination with said feedback signal ($n_{zu}$).

11. A method for controlling a flight vehicle as recited in claim 10, wherein said second transfer function comprises a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable.

12. A method for controlling a flight vehicle using input signals including normal acceleration ($n_z$), initial air speed ($V_o$), instantaneous airspeed (V'), and pilot command signal (P), said method comprising:

a first step of combining the initial airspeed ($V_o$) with the instantaneous airspeed (V') to produce a differential airspeed signal ($\Delta V$);

a second step of combining said differential airspeed signal ($\Delta V$) with the normal acceleration ($n_z$) to produce a feedback signal ($n_{zu}$);

a third step of combining said feedback signal ($n_{zu}$) with the pilot command signal (P) to produce a differential acceleration signal ($\Delta n_{zu}$);

a fourth step of applying an integrator having Laplace transform
$L[f(t)] = 2/s$ to said differential acceleration signal ($\Delta n_{zu}$) to produce an adjusted differential acceleration signal ($\Delta n'_{zu}$), s being the Laplace transform complex variable; and a fifth step of controlling the flight vehicle in response to said adjusted differential acceleration signal ($\Delta n'_{zu}$).

13. A method for controlling a flight vehicle as recited in claim 12, wherein said third step comprises a second substep of applying a second transfer function to the pilot command signal (P) prior to combination with said feedback signal ($n_{zu}$).

14. A method for controlling a flight vehicle as recited in claim 13, wherein said second transfer function comprises a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable.

15. A method for controlling a flight vehicle using input signals including normal acceleration ($n_z$), airspeed (V), and pilot command signal (P), said method comprising:
   a first step of combining airspeed (V) with normal acceleration ($n_z$) to produce a feedback signal ($n_{zu}$);
   a second step of applying a second transfer function to the pilot command signal (P) to produce a feedforward command signal ($n_{zuc}$);
   a third step of combining said feedback signal ($n_{zu}$) with said feedforward command signal ($\Delta n_{zuc}$) to produce a differential acceleration signal ($\Delta n_{zu}$);
   a fourth step of applying a first transfer function to said differential acceleration signal ($\Delta n_{zu}$) to produce an adjusted differential acceleration signal ($\Delta n'_{zu}$); and
   a fifth step of controlling the flight vehicle in response to said adjusted differential acceleration signal ($\Delta n'_{zu}$).

16. A flight control system for controlling a flight vehicle using input signals including normal acceleration ($n_z$), airspeed (V), column force ($F_c$), trim integrator command ($T_c$), and axis rotation rate (q), said system comprising:
   first combining means for combining airspeed (V) with normal acceleration ($n_z$) to produce a feedback signal ($n_{zu}$);
   fourth combining means for combining the column force ($F_c$) with the trim integrator command ($T_c$) to produce a pilot command signal (P);
   second transfer function applying means for applying a second transfer function to said pilot command signal (P) to produce a feedforward command signal ($n_{zuc}$);
   fourth transfer function applying means for applying a fourth transfer function to said pilot command signal (P) to produce an adjusted pilot command signal (P');
   fifth transfer function applying means for applying a fifth transfer function to said feedforward command signal ($n_{zuc}$) to produce an adjusted feedforward command signal ($n'_{zuc}$);
   fifth combining means for combining said adjusted pilot command signal (P') with said adjusted feedforward command signal ($n'_{zuc}$) to produce a feedforward compensator input signal ($n''_{zuc}$);
   second combining means for combining said feedback signal ($n_{zu}$) with said feedforward command signal ($n_{zuc}$) to produce a differential acceleration signal ($\Delta n_{zu}$);
   first transfer function applying means for applying an integrator having Laplace transform
   $L[f(t)] = 1/s$
   to said differential acceleration signal ($\Delta n_{zu}$) to produce an adjusted differential acceleration signal ($\Delta n'_{zu}$), s being the Laplace transform complex variable;

sixth combining means for combining said differential acceleration signal ($\Delta n_{zu}$), the normal acceleration ($n_z$), the airspeed (V), and said feedforward compensator input signal ($n''_{zuc}$) to produce a dynamic compensator output signal (DC);
   seventh combining means for combining said dynamic compensator output signal (DC) with said adjusted differential acceleration signal ($\Delta n'_{zu}$) to produce a dynamic flight control signal (DFC); and
   means for controlling a flight vehicle in response to said dynamic flight control signal (DFC).

17. A flight control system as recited in claim 16, wherein said second transfer function applying means comprises means for applying a first order lag transfer function having a Laplace transform $$L[f(t)] = \frac{K_F}{(Ts + 1)}$$

where $K_F$ is a feedforward controller gain, T is a feedforward controller time constant, and s is the Laplace transform complex variable.

18. A flight control system as recited in claim 16, wherein said sixth combining means comprises a dynamic compensator.

19. A flight control system for controlling a flight vehicle using input signals including normal acceleration ($n_z$), airspeed (V), column force ($F_c$), and trim integrator command ($T_c$), said system comprising:
   a feedback section,
   said feedback section comprising first combining means for combining the airspeed (V) with the normal acceleration ($n_z$) to produce a feedback signal ($n_{zu}$);
   a feedforward section,
   said feedforward section including third transfer function applying means for applying a third transfer function to said trim integrator command ($T_c$) to produce a velocity reference signal ($V_R$) and fourth combining means for combining the column force ($F_c$) with the velocity reference signal ($V_R$) to produce a pilot command signal (P);
   said feedforward section further including second transfer function applying means for applying a second transfer function to said pilot command signal (P) to produce a feedforward command signal ($n_{zuc}$), said second transfer function applying means comprising means for applying a first order lag transfer function having Laplace transform $$L[f(t)] = \frac{K_F}{(Ts + 1)}$$

where $K_F$ is a feedforward controller gain, T is a feedforward controller time constant, and s is the Laplace transform complex variable;
   said feedforward section further comprising fourth transfer function applying means for applying a fourth transfer function to said pilot command signal (P) to produce an adjusted pilot command signal (P'), fifth transfer function applying means for applying a fifth transfer function to said feedforward command signal ($n_{zuc}$) to produce an adjusted feedforward command signal ($n'_{zuc}$), and fifth combining means for combining said adjusted pilot command signal (P') with said adjusted feedforward command signal ($n'_{zuc}$) to produce a feedforward compensator input signal ($n''_{zuc}$);

second combining means for combining said feedback signal ($n_{zu}$) with said feedforward command signal ($n_{zuc}$) to produce a differential acceleration signal ($\Delta n_{zu}$);

first transfer function applying means for applying a first transfer function to said differential acceleration signal ($\Delta n_{zu}$) to produce an adjusted differential acceleration signal ($\Delta n'_{zu}$), said first transfer function comprising means for applying an integrator having Laplace transform $$L[f(t)] = 1/s$$

where s is the Laplace transform complex variable;

sixth combining means for combining said differential acceleration signal ($\Delta n_{zu}$), the normal acceleration ($n_z$), the airspeed (V), the column force ($F_c$), and said feedforward compensator input signal ($n''_{zuc}$) to produce a dynamic compensator output signal (DC);

seventh combining means for combining said dynamic compensator output signal (DC) with said adjusted differential acceleration signal ($\Delta n'_{zu}$) to produce a dynamic flight control signal (DFC); and means for controlling the flight vehicle in response to said dynamic flight control signal (DFC).

20. A method for controlling a flight vehicle using input signals including normal acceleration ($n_z$), airspeed (V), column force ($F_c$), and trim integrator command ($T_c$), said method comprising:

a first step of combining the airspeed (V) with the normal acceleration ($n_z$) to produce a feedback signal ($n_{zu}$);

a second step of combining the column force ($F_c$) with the trim integrator command ($T_c$) to produce a pilot command signal (P);

a third step of applying a second transfer function to said pilot command signal (P) to produce a feedforward command signal ($n_{zuc}$);

a fourth step of combining said feedback signal ($n_{zu}$) with said feedforward command signal ($n_{zuc}$) to produce a differential acceleration signal ($\Delta n_{zu}$);

a fifth step of applying an integrator having Laplace transform
$$L[f(t)] = 1/s$$
to said differential acceleration signal ($\Delta n_{zu}$) to produce an adjusted differential acceleration signal ($\Delta n'_{zu}$), s being the Laplace transform complex variable;

a sixth step of applying a fourth transfer function to said pilot command signal (P) to produce an adjusted pilot command signal (P');

a seventh step of applying a fifth transfer function to said feedforward command signal ($n_{zuc}$) to produce an adjusted feedforward command signal ($n'_{zuc}$);

an eighth step of combining said adjusted pilot command signal (P') with said adjusted feedforward command signal ($n'_{zuc}$) to produce a feedforward compensator input signal ($n''_{zuc}$);

a ninth step of combining said differential acceleration signal ($\Delta n_{zu}$), the normal acceleration ($n_z$), the airspeed (V), the column force ($F_c$), and said feedforward compensator input signal ($n''_{zuc}$) to produce a dynamic compensator output signal (DC);

a tenth step of combining said dynamic compensator output signal (DC) with said adjusted differential acceleration signal ($\Delta n'_{zu}$) to produce a dynamic flight control signal (DFC); and an eleventh step of controlling the flight vehicle in response to said dynamic flight control signal (DFC).

21. A method for controlling a flight vehicle as recited in claim 20, wherein said second transfer function of said third step comprises a first order lag transfer function having Laplace transform $$L[f(t)] = \frac{K_F}{(Ts + 1)}$$

wherein $K_F$ is a feedforward controller gain, T is a feedforward controller time constant, and s is the Laplace transform complex variable.

* * * * *

UNITED STATES PATENT AND TRADEMARK OFFICE
CERTIFICATE OF CORRECTION

PATENT NO. : 4,849,900

DATED : July 18, 1989

INVENTOR(S) : James D. Blight et al.

It is certified that error appears in the above-identified patent and that said Letters Patent is hereby corrected as shown below:

Claim 15, column 21, line 22, change "$(\Delta n_{zuc})$" to --$(n_{zuc})$--; and Claim 15, column 21, line 24, change "a first transfer function" to --an integer having Laplace transform $L[f(t)]=1/s$ where s is the Laplace transform complex variable--.

Signed and Sealed this

Second Day of July, 1991

Attest:

HARRY F. MANBECK, JR.

*Attesting Officer*  *Commissioner of Patents and Trademarks*